Feb. 3, 1959     C. A. WALTON     2,872,671
SHAFT POSITION INDICATING DEVICE
Filed Aug. 9, 1956     5 Sheets-Sheet 1
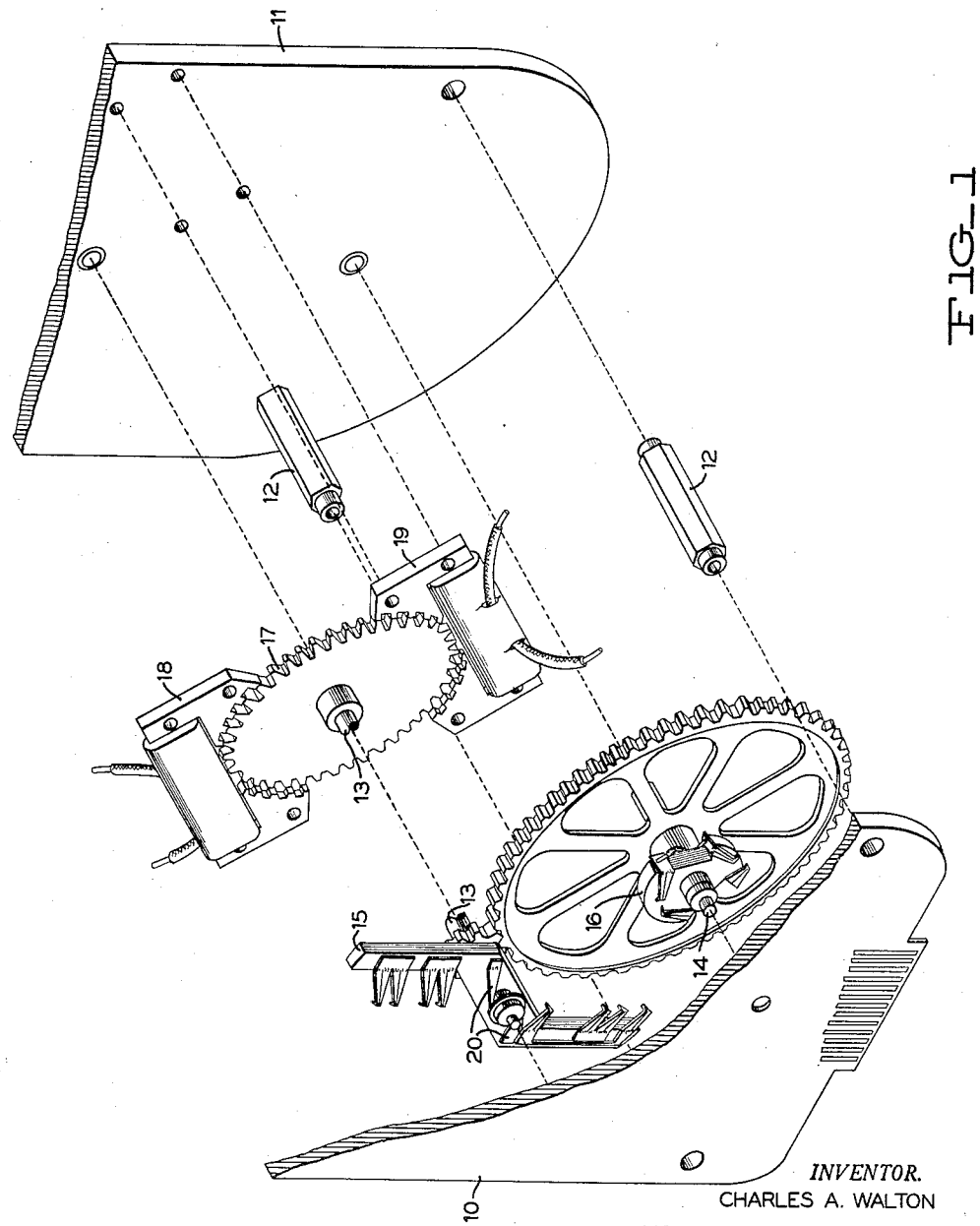
FIG_1
INVENTOR.
CHARLES A. WALTON
BY
AGENT

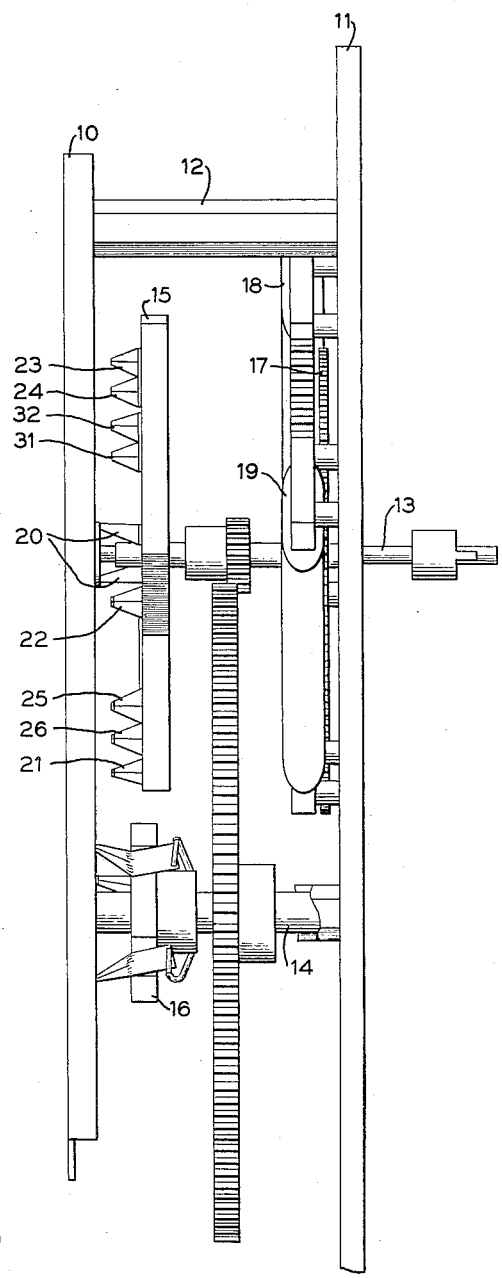
FIG_2

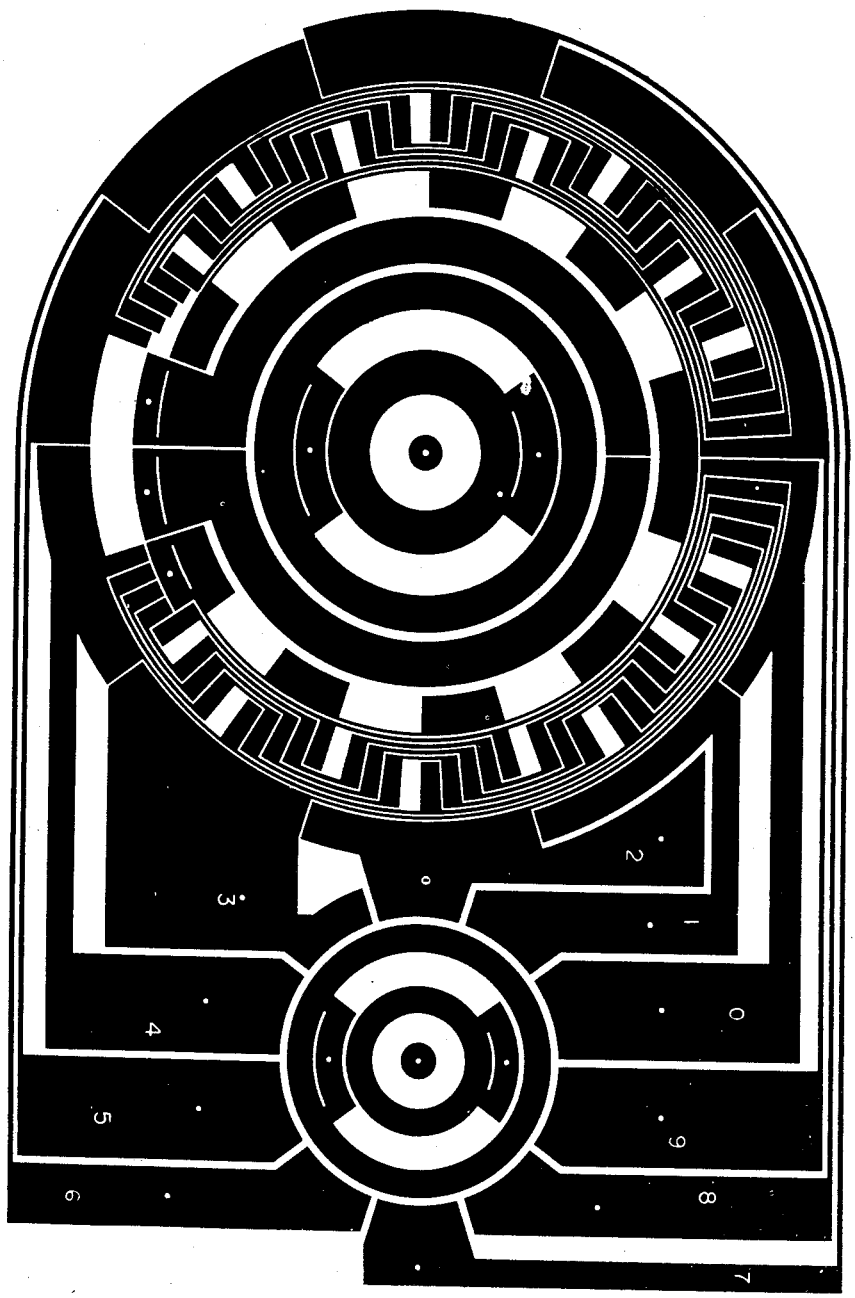
FIG_3

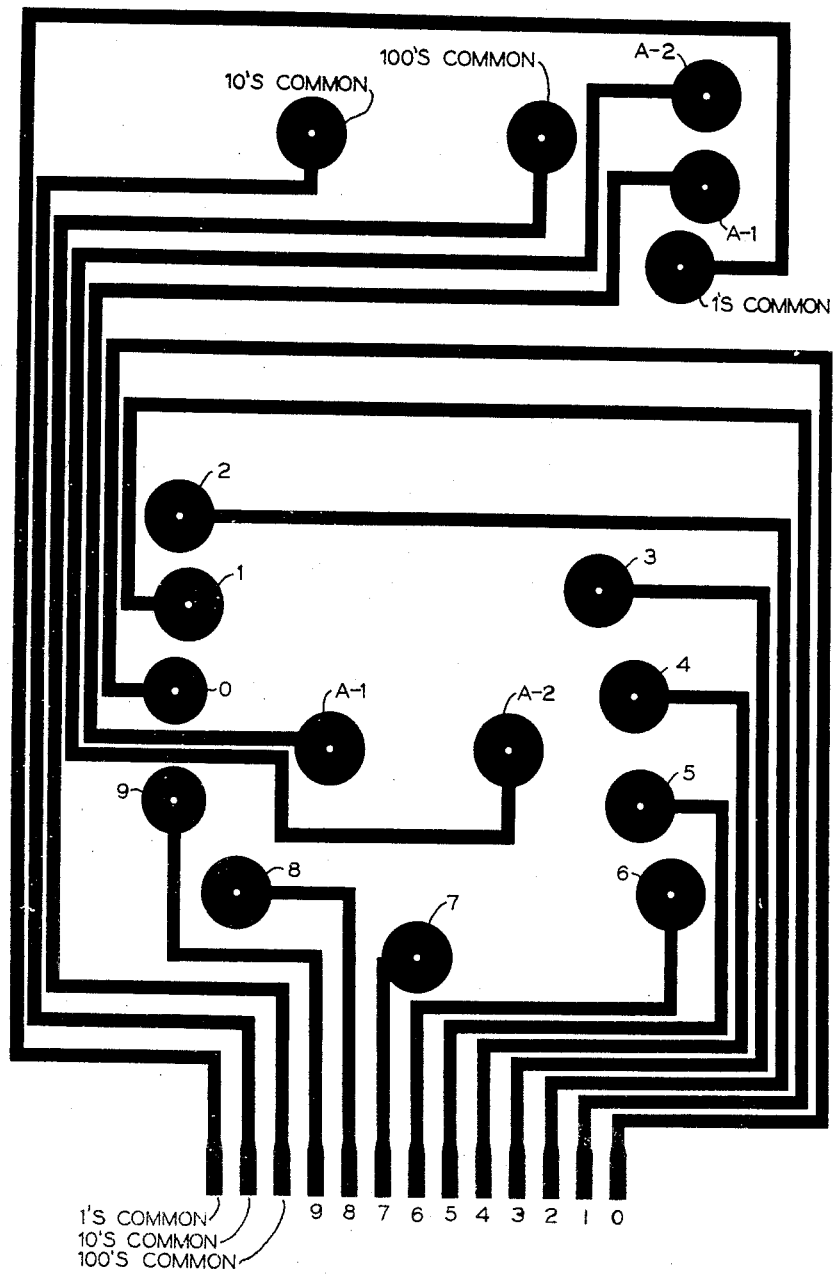
FIG_4

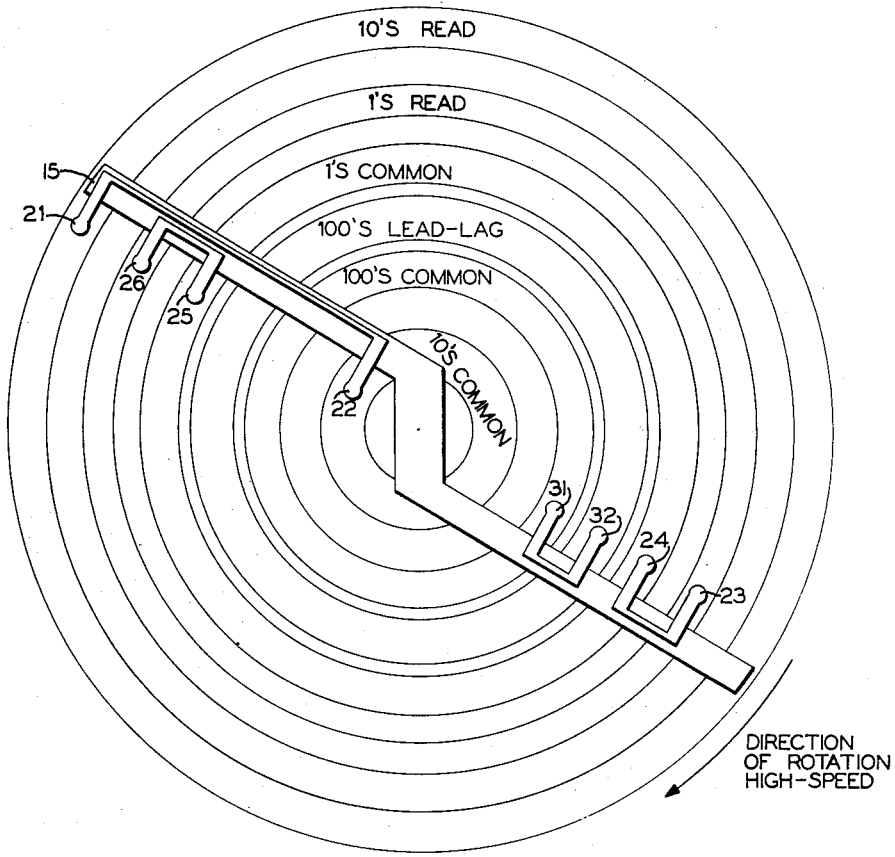
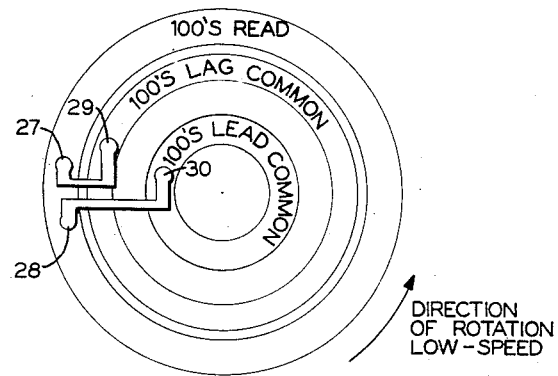
FIG_5

United States Patent Office 2,872,671
Patented Feb. 3, 1959

2,872,671

SHAFT POSITION INDICATING DEVICE

Charles A. Walton, Owego, N. Y., assignor to International Business Machines Corporation, New York, N. Y., a corporation of New York Application August 9, 1956, Serial No. 603,000

2 Claims. (Cl. 340—347)

This invention relates to shaft position indicating devices, and more particularly to a shaft position indicating device for providing electrical output signals having digital significance.

It is often desirable to be able to measure and automatically record basic physical phenomena in a digital manner. Specifically, in this invention, we are concerned with the basic phenomena of shaft position and the producing of a useful output for recording in some form of data storing medium.

In the prior art, there have been proposed arrangements in which one or more brushes attached to a mechanical member contact stationary contacts suitably arranged so that different circuit connections are established at different positions of the member. Such arrangements impose an unnecessary load on the member as a result of the friction between the brushes and the stationary contacts, and sometimes require slip ring connections to energize the shaft-carried brushes which tends to increase the complexity and cost of the device.

Other proposed arrangements provide a brush or set of brushes carried by the member that are normally clear of the stationary contacts and are mechanically depressed to engage the stationary contacts when it is desired to read out the position of the member electrically. Should the brushes be stopped at a position in which they fail to properly engage the stationary contacts, either no reading or an ambiguous reading may result.

A principal object of the invention is to provide converting mechanism which changes a shaft position into electrical signals having digital significance.

Another object of the invention is to provide means for accurately stopping a rotatable driven member in any one of a plurality of aliquot positions.

A further object of this invention is to provide a shaft position indicating device employing a stationary electrical contact pattern which may have all necessary connections therefor on an insulating mounting plate that is economical to manufacture.

Another object of this invention is to provide a shaft position indicating device of the type utilizing movable brushes that engage a stationary contact pattern, in which the brushes are shifted axially to establish proper contact with the stationary contact pattern.

Still another object of the invention is to provide a mechanism which has a high degree of accuracy combined with reliability.

A further object of the invention is to provide a mechanism with low torque requirements.

It is a further object of the invention to provide an indicating device comprising a plurality of geared shafts, with electrical readout means which is not affected by play in the gearing.

A further object is to provide an indicating device employing a panel of "printed circuits" (or similar) type, wherein groups of contact segments are laid out in a circular array in such a way that segments pertaining to like cardinal numbers are all connected together, but separated from all segments of unlike cardinal numbers.

A still further object of the invention is to provide a digital indicating device embodying a plurality of different ordinal sets of position indicating elements, with means to read out all of the sets in sequence through a single group of output terminals.

Briefly, a position indicating device constructed in accordance with the invention comprises two main shafts rotating in a proportional relationship. Each shaft carries brushes that are arranged to cooperate with a printed or etched conducting pattern. During a readout the brushes make contact with the pattern in such a way as to indicate the angular position of the low speed shaft in a digital manner.

A feature of the invention is the provision of a 100 tooth detent gear of magnetic material attached to the high speed shaft that is movable in an axial direction and adapted to be electromagnetically attracted so as to bring the brushes attached to the high speed shaft into contact with the conductive pattern. A spring normally biases the brushes away from the pattern. The brushes on the low speed shaft are always in touch with the pattern.

Another feature of the invention is the provision of two or more magnets mounted with the pole faces in proximity to the detent wheel and containing notches cut to the same pitch as the detent wheel. The function of the magnets is twofold, one, serving to detent the high speed shaft in one of a plurality of aliquot positions, and two, to move the high speed shaft mechanism in an axial direction so that the brushes will contact the pattern.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an expanded schematic illustration of a shaft position indicating device constructed in accordance with a preferred embodiment of the invention, for indicating the angular position of a shaft.

Fig. 2 is a side view of a position indicating device constructed in accordance with the invention.

Fig. 3 is a plan view of one form of stationary contact pattern which may be employed in the device.

Fig. 4 is a back view of the pattern showing interconnections and output signal conductors.

Fig. 5 is a schematic showing of the concentric circle paths traversed by the brushes associated with the high-speed and low-speed shafts and the manner in which the brushes are interconnected.

Similar reference characters refer to similar parts in each of the several views.

Referring to Fig. 1 of the drawings, there is illustrated in schematic form a position indicating device for indicating, by electrical signals having digital significance, the angular position of a rotatable shaft. The device includes a pair of end plates 10 and 11 held in suitably spaced relationship by several studs 12. A high-speed input shaft 13 and a low-speed shaft 14 are rotatably mounted in end plates 10 and 11 and are geared together with a gear ratio of 10:1. A brush arm 15 provided with a plurality of brushes is attached to shaft 13. A brush member 16 provided with several brushes is attached to shaft 14. The brushes are arranged to engage the segments of a conductive pattern (Fig. 3) fixed to the inboard side of end plate 10, the detail of which will become apparent later in the description.

For the purpose of detenting the mechanism, the high-speed shaft 13 carries a one hundred tooth gear 17 of magnetic material. Detenting magnets 18 and 19 having pole faces with notches cut to the same pitch as the detent gear 17 are mounted on plate 11 so that the pole faces are in proximity to the detent gear 17. The high-speed shaft 13 is provided with a limited amount of axial movement so that the brushes on brush arm 15 may or may not contact the conductive pattern. During rotation of high-speed shaft 13, springs 20 bias the shaft 13 so that the brushes on brush arm 15 are out of contact with the conductive pattern. The brushes associated with the low-speed shaft 14 are always in touch with the conductive pattern.

Pattern description

Referring now to Fig. 3, there is shown an illustration of a suitable stationary contact pattern constructed in accordance with the invention. Preferably, the contact pattern is constructed by well-known printed circuit techniques, so that the pattern shown would exist on the inboard side of plate 10, which is made of an insulating material. The portions of the pattern shown in black represent the conductive areas. The upper portion of the pattern is associated with the high-speed shaft and the lower portion is associated with the low-speed shaft.

The electrical connections between the conductive areas of the pattern of Fig. 3 and the input and output terminals is accomplished by another printed circuit pattern, as shown by Fig. 4. The pattern of Fig. 4 is printed on the outward side of plate 10. Inter-pattern connections are made by conductors passed through small holes in plate 10 and fusibly attached to the segments of the conductive patterns at the points indicated by the small white circular spots within the conductive segments.

Fig. 5 is a schematic showing of the six consecutive circle paths traversed by the brushes associated with the high-speed shaft and the three consecutive circle paths traversed by the brushes associated with the low-speed shaft. This drawing serves to identify the different paths and to show how the brushes on the brush carrying members are interconnected. A superimposing of Fig. 5 on the pattern of Fig. 3 will serve to show and identify the different paths on the conductive pattern.

With a concurrent reference to Figs. 3 through 5, it may be noted there are ten conductors numbered 0 to 9. Each conductor winds in and out through the units read circle in either the 0 to 4 area (lower half) or in the 5 to 9 area (upper half) of the high-speed pattern. Each conductor connects from its unit read circle to its ten's read circle and then continues so as to connect with the hundred's read circle associated with the low speed pattern and then connects with its respective output terminal (Fig. 4).

In addition to the ten output conductors, there are three input or common conductors designated as the 100's common, the 10's common, and the 1's common, all of which conenct to the high speed shaft pattern. There are two auxiliary conductors that connect between the high-speed and low-speed patterns.

The 10's arrangement will be described first because it is considered to be most elementary. The 10's reading brush 21 (Fig. 5), attached to the brush arm 15, contacts one of the conductive areas in the 10's read or outermost contact path (Fig. 3) depending upon the angular position of the high-speed shaft 13. The 10's reading brush 21 connects with the 10's common brush 22 which rides on the number 1 or innermost path. When the 10's common path is energized from the 10's common input terminal, the 10's read brush 21 will energize an appropriate one of the ten areas in the 10's read path depending upon the angular position of the high-speed shaft 13 thereby producing a resultant output signal at the respective output terminal (Fig. 4).

The 1's pattern surrounds the high-speed shaft 13 and utilizes two pairs of brushes. Starting at the 00 angular position, the 1's read brush 23 is adapted to contact the 0 to 4 conductive areas in the 1's read or number 5 path. The 1's read brush 23 is connected to a conductive area in the 1's common or number 4 path via the 1's common brush 24. After the 0 to 4 areas in the 1's read path, the 1's common brush 24 leaves a conductive area in the 1's common path and the brushes 23 and 24 are not connected electrically for the 5 through 9 positions. Instead, a second pair of brushes, 180 degrees opposed from the first pair, are effective. The 1's common brush 25 serves to connect with the 5 through 9 positions via the 1's read brush 26. It may be noted with reference to the pattern of Fig. 3, that for each conductive area in the 10's read path there are ten conductive areas within the 1's read path occupying the same angular relationship.

The main part of the 100's pattern is around the low-speed shaft 14. There are ten conducting segments adapted to be contacted by two brushes, namely the 100's read lag brush 27 and the 100's read lead brush 28, which traverse the 100's read path. The 100's read lag brush 27 connects with the 100's lag common path via the 100's lag common brush 29. The 100's read lead brush 28 connects with the 100's lead common path via the 100's lead common brush 30. The distance between the brushes 27 and 28 is less than the width of a single one of the conductive segments on which these brushes travel. Thus, before brush 28 leaves any segment the brush 27 has already come over that segment. This is one of the conditions required for eliminating ambiguity in readout of the 100's digit, as will appear presently.

The 100's common input terminal (Fig. 4) is connected to the 100's common path about the high-speed shaft 13. Brush 31 attached to brush arm 15 connects the 100's common path with the 100's lead-lag path through brush 32 also attached to brush arm 15. The 100's lead-lag path is divided into two parts, an upper and lower part. The upper part is connected by the auxiliary A-2 conductor to the 100's lag-common path about the low-speed shaft 14. The lower part of the 100's lead-lag path about the high-speed shaft is connected by the auxiliary A-1 conductor to the 100's lead-common path about the low speed shaft.

At the time the 10's read brush 21 and the 1's read brush 26 cross over from segment 9 to segment 0 the 100's lead-lag brush 32 crosses over from the lower part of the 100's lead-lag path to the upper part of this path. This occurs when lead brush 28 is on a different conducting segment than the lag brush 27; for instance, when the lead brush 28 is on segment 3 and the lag brush 27 is on segment 2. Thus the step up (or down) of the readout of the 100's digit is dependent upon a brush (the lead-lag brush 32) mounted upon the same arm with the 10's read brush 21 and the 1's read brush 26 and is unaffected by any play in the gearing between the two shafts.

At the time the 10's read brush 21 crosses over from segment 4 to segment 5 and lead-lag brush 32 passes from the upper part of the 100's lead-lag path to the lower part of this path the lag brush 27 has arrived over the same segment with the lead brush 28. The crossover of lead brush 28 from one segment to another occurs just prior to the time the 10's read brush crosses from the segment 9 to the segment 0. The 100's pattern in effect counts the number of revolutions made by the high-speed shaft 13.

To effect a readout, a first signal to the digitizer energizes the detenting magnets 18 and 19. The magnets 18 and 19 attract the detent gear 17 so that the salient portions of the magnet pole faces attract the protruding portions of the detent gear 17 and the high portions of the parts line up distinctly opposite each other. Thus, the high-speed shaft and the accompanying brush arm 15 is located near the center of one out of 100 possible positions. The axial component of the magnetic attraction pulls the brushes attached to arm 15 into contact with the pattern on the inboard side of end plate 10. With the brushes detented and in contact with the pattern, readout may proceed. Assuming readout from the highest order count to the lowest, the 100's common input terminal is momentarily energized. Next the 10's common and 1's common input terminals are successively energized, and accordingly the proper output conductors to provide a valid three decimal value representative of the angular shaft position are successively energized. The device may be read in the opposite direction equally as well.

The foregoing description and the arrangements shown in the drawings are in accordance with a preferred embodiment of the invention. However, it can be seen that a number of variations are readily possible. For example, the pattern could be made into one thousand parts about the lower order shaft. The pattern and design could be rearranged to make the first shaft read ten positions and there may be any number of shafts, at successively lower speeds, so that very high order decimal counts could be obtained. Other pattern configurations are conceivable.

A particular advantage of the proposed digitizer is its low manufacturing cost. The device is readily adaptable to various mechanisms for which it is desirable to digitize the shaft positions. The reliability is excellent in most applications.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device of the class described, means forming a pattern of conductive elements including a circular array of higher order segments subtending equal angles, there being one such segment for each cardinal number of a number system, said pattern also including a circular array of groups of lower order segments concentric with the first mentioned array, each of said groups having an angular extent equal to the angular length of a single higher order segment, each group of lower order segments including a segment for each cardinal number of said number system, all lower order segments of like cardinal value being electrically connected to the respective higher order segments of the same cardinal value, said pattern including a circular common conductor pertaining to the higher order array of segments and a second common circular conductor pertaining to the lower order array of segments, rotary brush means for connecting the higher order segments individually to said higher order common conductor, and rotary brush means for connecting the lower order segments individually to said lower order common conductor.

2. A device as described in claim 1 characterized by the fact that said lower order common conductor is provided with gaps so arranged that each gap is diametrically opposite to a conductive portion of said common conductor, said gaps and the conductive portions each having an angular extent approximately equal to one-half the length of one of said higher order segments, said groups of lower order segments being subdivided so that the two halves of each group are alternately located on opposite sides of the circular array in radial alignment with related conductive portions of the lower order common conductor, and lower order brush means including two sets of brushes approximately 180° apart for connecting the conductive portions of said common conductor with individual ones of the lower order segments.

References Cited in the file of this patent

UNITED STATES PATENTS

| | | |
|---|---|---|
| 2,496,585 | Harper | Feb. 7, 1950 |
| 2,502,837 | Entz | Apr. 4, 1950 |
| 2,548,731 | Lehde | Apr. 10, 1951 |
| 2,666,912 | Gow | Jan. 19, 1954 |
| 2,685,043 | Durant | July 27, 1954 |
| 2,719,284 | Roberts | Sept. 27, 1955 |
| 2,766,445 | Bland | Oct. 9, 1956 |